United States Patent
Landau et al.

(10) Patent No.: US 8,524,071 B2
(45) Date of Patent: Sep. 3, 2013

(54) PROCESS FOR ADSORPTION OF SULFUR COMPOUNDS FROM HYDROCARBON STREAMS

(75) Inventors: Miron V. Landau, Beer-Sheva (IL); Mordechay Herskowitz, Meitar (IL); Iehudit Reizner, Lehavim (IL); Yaron Konra, Rupin (IL); Himanshu Gupta, Lorton, VA (US); Rajeev Agnihotri, Beaumont, TX (US); Paul J. Berlowitz, Glen Gardner, NJ (US); James E. Kegerreis, Fairfax, VA (US)

(73) Assignee: ExxonMobil Research and Engineering Company, Annadale, NJ (US)

( * ) Notice: Subject to any disclaimer, the term of this patent is extended or adjusted under 35 U.S.C. 154(b) by 222 days.

(21) Appl. No.: 12/799,120

(22) Filed: Apr. 19, 2010

(65) Prior Publication Data

US 2010/0206776 A1 Aug. 19, 2010

Related U.S. Application Data

(62) Division of application No. 11/977,898, filed on Oct. 26, 2007, now abandoned.

(60) Provisional application No. 60/855,241, filed on Oct. 30, 2006.

(51) Int. Cl.
*C10G 25/00* (2006.01)
*C10G 29/04* (2006.01)
*C10G 29/06* (2006.01)

(52) U.S. Cl.
USPC ........... 208/244; 208/245; 208/250; 208/299; 208/300; 208/307

(58) Field of Classification Search
USPC ................. 208/244, 245, 250, 299, 300, 305, 208/307
See application file for complete search history.

(56) References Cited

U.S. PATENT DOCUMENTS

2003/0226786 A1* 12/2003 Feimer et al. ................. 208/299
2004/0007506 A1* 1/2004 Song et al. .................... 208/244

FOREIGN PATENT DOCUMENTS

WO 01/23501 A1 4/2001

OTHER PUBLICATIONS

Sun, Mingyong et al. "Adsorptive thermodynamics of sulfur- and nitrogen- containing molecules on NiMoS: a DFT study" Catalysis Letters. vol. 109, Nos. 3-4, Jul. 2006, pp. 133-138.*
Nozaki, F. et al, "Chemical Composition o the Catalyst Prepared by Reduction of Nickel Orthophosphate in Hydrogen and Catalytic Activity for Partial Hydrogenation of 1,3-Butadiene", Journal of Catalysis, Academic Press, New York, NY, US, vol. 40, 1975, pp. 166-172, XP009009980 ISSN: 0021-9517.
Robinson, W. R. A. M. et al., "Phosphorus Promotion of Ni(Co)-Containing Mo-Free Catalysts in Quinoline Hydrodenitrogenation", Journal of Catalysis, Academic Press, Duluth, MN, US, vol. 161, No. 2, Jul. 1996, pp. 539-550, XP001147827 ISSN: 0021-9517.
Capenter, J. P. et al., "Organometallic compounds as single-source precursors to nanocomposite materials: an overview", Journal of Organometallic Chemistry, Elsevier-Sequoia S.A. Lausanne, CH, vol. 557, No. 1, Apr. 20, 1998, pp. 121-130, XP004122372 ISSN: 0022-328X.
Xiang, L. et al., "Experimental study on synthesis of NiO nano-particles", Scripta Materialia, Elsevier, Amsterdam, NL, vol. 47, No. 4, Aug. 2002, pp. 219-224, XP004372398 ISSN: 1359-6462.
Pejova, B. et al., "A solution growth route to nanocrystalline nickel oxide thin films", Applied Surface Science, vol. 165, 2000, pp. 271-278, XP002469817 Chapter 3.1.

* cited by examiner

*Primary Examiner* — Walter D Griffin
*Assistant Examiner* — Renee E Robinson
(74) *Attorney, Agent, or Firm* — Paul E. Purwin; David M. Weisberg

(57) ABSTRACT

The present invention provides a high capacity adsorbent for removing sulfur from hydrocarbon streams. The adsorbent comprises a composite material containing particles of a nickel phosphide complex $Ni_xP$. The adsorbent is utilized in a sulfur removal process that does not require added hydrogen, and run at relatively low temperatures ranging from about 150° C. to about 400° C. The process of this invention enables "ultra-deep" desulfurization down to levels of about 1 ppm and less.

17 Claims, 6 Drawing Sheets

| Test | Diesel A | Desulfurized Diesel A |
|---|---|---|
| Average Wear Scar, mm | 0.606 | 0.606 |
| API Gravity @ 60°F | 36.9 | 36.9 |
| Calculated Cetane Index | 46.6 | 46.0 |

Figure 10

PROCESS FOR ADSORPTION OF SULFUR COMPOUNDS FROM HYDROCARBON STREAMS

CROSS-REFERENCE TO RELATED APPLICATIONS

This application is a divisional of U.S. non-provisional patent application Ser. No. 11/977,898 filed Oct. 26, 2007 now abandoned, which claims the benefit of U.S. provisional patent application Ser. No. 60/855,241 filed Oct. 30, 2006.

SUMMARY OF THE INVENTION

The present invention provides a process for removing sulfur compounds from liquid hydrocarbon streams by using a high capacity adsorbent which is a composite material containing particles of nickel phosphide complex having a Ni/P ratio ranging from about 0.5:4, preferably about 2:3 and most preferably about 2.2:2.5. The composite is preferably distributed in a phase containing silica, alumina or carbon, and obtained by reduction of composite material consisting of nickel phosphate ($Ni_2P_2O_7$), nickel oxide, and/or nickel hydroxide, ammonium phosphate (($NH_4)_2HPO_4$), wherein the composite material is preferably formed by deposition of nickel and phosphorus salts onto silica, mesoporous silica, silica-alumina or carbon materials. The invention further includes using a sorbent where part of silica or carbon is removed from the said composite material after reduction increasing the loading of the nickel phosphide complex. The process for desulfurization according to this invention is preferably a one-stage process that is carried out at temperature in range from 150° C. to 400° C., and it does not require a hydrogen enriched atmosphere. The process can be carried out both in a batch mode and in a continuous mode. The affinity of the adsorbent towards sulfur compounds enables ultra-deep desulfurization down to the levels of about 1 ppm and less. The present invention can adsorb more than 1 g sulfur per 100 g of adsorbent. The invention further enables periodic regeneration of the sorbent by removing the adsorbed sulfur in reductive atmosphere that increases the effective total sulfur capacity to more than about 2.0 g sulfur per 100 g.

BACKGROUND

The ultradeep desulfurization of liquid hydrocarbon fuels by adsorption of sulfur-organics without added hydrogen with a reasonable adsorbents sulfur capacity can be done using the two following processes—reactive adsorption of sulfur compounds with the sorbent containing metallic nickel ($Ni°$) deposited on a composite support converting $Ni°$ to bulk nickel sulphide phases (as illustrated in US Patent Application 20050258077 A1, 2005) and by equilibrium adsorption of sulfur compounds with a zeolite sorbent containing partially reduced Cu(1+) cations (as illustrated by A. J. Hernandez-Maldonado, R. T. Yang, Ind. Eng. Chem. Res., 42, 123, 2003). Both processes suffer disadvantages relative to the present invention. The sulfur capacity of $Ni°$ phase in the first process even at high nickel dispersion of >30% is limited by the tendency of $Ni°$ to convert the existing unsaturated hydrocarbons in fuel to carbonaceous deposits. This leads to blocking of the sorbents surface at a faster rate than that needed for full conversion of $Ni°$ phase to bulk nickel sulphides. This is also one of the reasons that the deactivated nickel sorbents cannot be regenerated by reductive treatment and oxidative regeneration techniques need to be employed to restore the material. Oxidative regeneration, i.e. burning out the carbonaceous deposits, converts the $Ni°$ phase to poorly dispersed NiO phase. Reduction of NiO back to $Ni°$ retains the lower dispersion in $Ni°$, leading to a lower sulfur capacity in a subsequent desulfurization cycle. The coke-forming ability of olefins contained in light gasoline fuels is neutralized to a great extent by oxygenates (MTBE, ethanol, etc.) that are generally added to gasolines. This allows reaching more than 1 g sulfur capacity per 100 g of sorbent, as taught in co-pending U.S. Patent Application 20050258077 A1, 2005. In case of diesel fuels derived from fossil sources that do not contain oxygenates but include mono-, bi- and triaromatics with high coke-forming ability, the processes implementing $Ni°$-based sorbents yields very low sulfur capacity of less than 0.1 g per 100 g. This low capacity and sorbent non-regenerability substantially impairs the commercial application of such process for ultradeep desulfurization of diesel fuels.

The equilibrium adsorption process using Cu(1+) containing zeolite to sorbents is generally limited to hydrocarbon feedstocks with relatively high sulfur contents of >50 ppm. At sulfur content in the feedstock <20 ppm, which is the case for modern hydrotreated diesel fuels, the adsorption equilibrium established in this process at conventional temperatures does not reduce sulfur to below 1 ppm, as taught herein.

BRIEF DESCRIPTION OF THE DRAWINGS

FIG. 10 shows key bulk properties of feed and product diesel fuel.

DETAILED DESCRIPTION OF THE PREFERRED EMBODIMENT

The transition metal phosphide materials having the formula $MP_x$, where M is selected from the group consisting of V, Cr, Mn, Fe, Co, Ni, Nb, Mo, Ta and W, x is between 0.1 and 10, and the material(s) are dispersed on a high surface area oxide support, are known catalysts for hydrodesulfurization of hydrocarbon feedstocks by converting the organo-sulfur compounds to $H_2S$. The present invention is based upon the discovery that select materials belonging to this group adsorb substantial amounts of organic sulfur from the hydrocarbon streams without added hydrogen. The novel adsorbent is a nickel phosphide complex $Ni_xP$, with x=2-3, stabilized in the form of 2-50 nm nanocrystals of $Ni_2P$, $Ni_{12}P_5$, $Ni_3P$ phases, or their mixtures, in mesoporous supports matrices. Sulfur adsorption with this material is sufficient for ultradeep desulfurization to the level of about 1 ppm residual sulfur or less of hydrotreated hydrocarbon fuels containing about 20 ppm sulfur, with sulfur capacity more than 1 g per 100 g of sorbent.

The present invention includes a process for ultra-deep desulfurization of hydrotreated hydrocarbon liquid feedstocks, especially of diesel fuels.

Nickel Phosphide Complex

Figure 1:
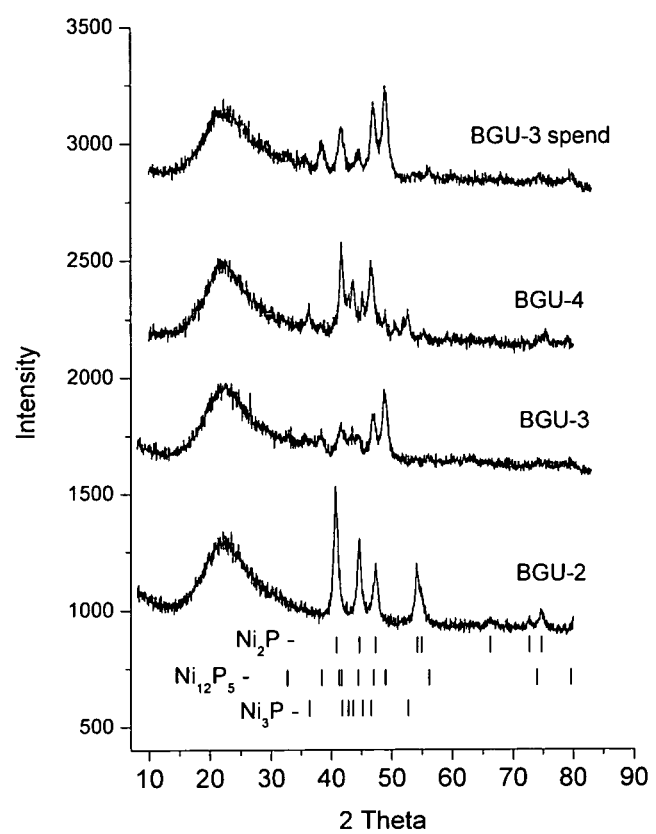
FIG. 1 shows XRD patterns of fresh and used $Ni_xP/SiO_2$.

One embodiment of the present invention is a nickel phosphide complex comprising 2-50 nm nanoparticles of the phases $Ni_2P$, $Ni_{12}P_5$, $Ni_3P$, or their mixtures thereof, that may be used as an active material for reactive adsorption of dibenzothiophene derivatives such as those existing in hydrotreated diesel fuels. Though not wishing to be bound to a particular theory, the metallic character of nickel in these compounds is believed to cause strong interaction of the lowest unoccupied molecular orbital (LUMO) of S-compound with valence bands of surface nickel atoms in NixP phase leading to the splitting of C—S bonds that shifts the adsorption equilibrium $Ni_xP+S—R \leftarrow \rightarrow S—R \ldots Ni_xP$ to the right. This permits reducing the feed sulfur content to less than 1 ppm even with inlet sulfur of about 20 ppm. Withdrawing a part of electron density from the nickel atoms by phosphorus in $Ni_xP$ phases imparts a partial positive charge (Ni δ+) to nickel atoms, which decreases their ability to interact with electrophilic sulfur, depressing the formation of bulk Ni-sulphide phases. The X-ray diffractograms of freshly reduced and spent, 30 wt. % $Ni_{12}P_5/SiO_2$, after adsorption of 1.05 g sulfur per 100 g material in desulfurization of a standard diesel fuel with 15 ppm sulfur content, are substantially identical as illustrated in FIG. 1. This indicates an absence of bulk nickel sulphide phases. Concurrently, a partial positive charge on nickel atoms in $Ni_xP$ phases is believed to reduce their ability to convert aromatic compounds into dense carbonaceous deposits, so that the amount of carbon deposits after a run does not exceed about 4-5 wt %. The reductive treatment of spent $Ni_xP$ based materials allows removing the adsorbed sulfur from the surface of spent sorbent making it possible to conduct several sulfur adsorption cycles with the present invention using the same $Ni_xP$-based material. This extends the total amount of sulfur that could be adsorbed by a batch of sorbent.

In one embodiment of the present invention, the adsorbent has high loading of disperse $Ni_xP$ complexes, ranging from about 15 st % to about 80 wt %, preferably 20 wt % to about 60 wt %. The disperse $Ni_xP$ complexes have crystal sizes ranging from about 2 nanometers to about 50 nanometers (preferably 2-30 nm), and are deposited on silica, mesostructured silica, silica-alumina, carbon or a combination thereof with surface area ranging from about 200 $m^2$/gm to about 800 $m^2$/gm, and pore diameter ranging from about 5 nanometers to about 30 nanometers. The material is prepared by reduction of nickel phosphate or nickel oxide (hydroxide) deposited on the mesoporous supports together with ammonium phosphate salt.

Impregnation of mesoporous supports (i.e. silica or silica-alumina) with a clear aqueous solution of $Ni(NO_3)_3$ and $(NH_4)_2HPO_4$ stabilized with $HNO_3$ at pH=4 at Ni/P ratios in range of about 0.5-4.0 (preferably 2-3) alone may be insufficient to reach, after reduction, $Ni_xP$ loadings more than 30 wt. % without substantial blocking of the supports pores and formation of large $Ni_xP$ nanoparticles of >30 nm. One aspect of the present invention is increasing the $Ni_xP$ loading up to 60-80 wt. %. While this may be achieved by improving deposition techniques, in one embodiment of the present invention increased load is accomplished by extraction of silica from reduced $Ni_xP/SiO_2$ ($SiO_2$—$Al_2O_3$) composite material. In one embodiment, treating the reduced adsorbent with a solution of a strong base (NaOH) or aqueous HF at conditions that do not affect the composition of active $Ni_xP$ phase resulted in extraction of silica and consequently increased $Ni_xP$ loading. The silica support material is preferentially "leached" out from the reduced adsorbent material, partially or completely, by the above mentioned chemical treatment. These chemicals have no substantial effect on active $Ni_xP$ and thus the composition of active phase is substantially unchanged. In another embodiment, high loading of active phase $Ni_xP$ may be obtained by implementation of homogeneous deposition-precipitation of highly dispersed NiO on mesoporous silica (silica-alumina) support from aqueous solution of Ni-salt in presence of urea at 50-80 wt. % Ni loading, as taught in co-pending US Patent Application 20050258077 A1, 2005, followed by deposition of $(NH_4)_2HPO_4$ on the $NiO/SiO_2$ ($SiO_2$—$Al_2O_3$) material and reduction of so obtained material. In an additional embodiment, high loading of $Ni_xP$ phases may be obtained by implementation of homogeneous deposition-precipitation of highly dispersed nickel phosphate at 45-65% nickel loadings in presence of urea on mesoporous silica (silica-alumina) support from aqueous solution containing both Ni-salt and ammonium phosphate stabilized by nitric acid, followed by reduction of so obtained material.

The above mentioned embodiments are not limiting and there are potentially other techniques, as may be apparent to someone skilled in the art, of depositing fine crystalline $Ni_xP$ on a porous support. The present invention is an adsorbent with desired loading of $Ni_xP$ (60-80%) and crystallite size (2-50 nm), surface area (200-800 m2/g) and pore size (5-30 nm).

Sulfur Removal Process

The process of this invention for removing sulfur compounds from a liquid hydrocarbon stream comprises i) providing a composite material containing $Ni_2P$, $Ni_{12}P_5$, $Ni_3P$ phases or their mixture as nanocrystals with 2-50 nm size and 20-80 wt. % loading stabilized in mesoporous silica, silica-alumina or carbon support matrix having surface area in range 200-800 $m^2$/g and average pore diameter in range 5-30 nm; and ii) contacting said the liquid hydrocarbon stream with the adsorbent at temperature in range about 150-400° C., preferably in the range between 250 and 350° C. The process is carried out without added hydrogen and it can be performed in a batch mode or in a continuous mode. When the process is continuous, the liquid hour space velocity is chosen as to reach a required level of sulfur residue. The LHSV is from about 0.5-30/hr, preferably from about 1-20/hr and most preferably from about 3-15/hr. A preferred nickel content in the adsorbent that is used in the process of this invention is 20 wt. % to 80 wt. %, preferably from 25 wt. % to 70 wt. %, with the Ni/P atomic ratio from about 2 to about 3, preferably from about 2.2 to about 2.5.

The reduced composite material of the composition, crystal size of to active nickel phosphide phases and matrix texture help to react with organo-sulfur compounds, especially dibenzothiophenes conventionally existing in liquid hydrocarbon streams such as hydrotreated diesel fuels to adsorb sulfur. Such irreversible interaction of sorbent and organo-sulfur compounds, that remain in diesel fuel after hydro-desulfurization treatment at oil refineries, provides ultra-deep removal of sulfur with virtually no other impact on the hydrocarbons that constitute the main part of the diesel fuel.

After saturation with sulfur compounds the adsorbent used in the process according to present invention can be regenerated by reductive treatment, for example by exposing the adsorbent to hydrogen flow at about 450-600° C. This removes the adsorbed sulfur enabling further reuse of the sorbent at about the same adsorbent conditions reaching the same level of residual sulfur as in the first run. The adsorbent can be successfully reused in several adsorption-regeneration cycles, yielding total effective sulfur capacity of >2 g sulfur per 100 g sorbent.

In alternative embodiments, the Ni$_x$P-based adsorbent described herein may be used for removing sulfur compounds from different hydrocarbon streams, where the hydrocarbon can comprise a material chosen from hydrotreated naphtha with added oxygenates for octane number improvement, diesel and jet fuels, alkanes, alkenes and aromatic hydrocarbons, and the sulfur compounds can comprise a material chosen from organic sulfides, organic disulfides, thiols, and aromatic compounds like thiophene, benzothiophene, dibenzothiophene and their derivatives.

EXAMPLE 1

Comparative

In 250 ml flask placed in a heating bath, provided by magnetic stirrer and condenser, 5 g of silica gel (PROMEKS, PI-258) calcined at 500° C. for 2 h with surface area of 220 m$^2$/g and pore diameter of 26 nm was placed with a mixture of two solutions 0.5 g aluminum tri-sec butoxide with 100 mL toluene, and 1.5 g triethylamine with 100 mL. The toluene suspension was vigorously stirred at 85° C. for 6 h, and then the solid was separated by filtration. The alumina-grafted mesoporous silica solid was suspended in 150 mL of ethanol solution containing 0.22 g of water and it was stirred at room temperature for 24 h. The alumina-grafted mesoporous silica solid then filtered and dried with vacuum at 85° C. for 2 h, followed by gradual calcinations in periods of 2 hours at temperatures 250° C. and 400° C. and then calcinated in air for 4 hours at 500° C. The alumina-grafted mesoporous silica material exhibit surface area of 243 m$^2$/g and a narrow mesopore size distribution, with the mean pore diameter of 5 nm and the pore volume of 0.3 cm$^3$/g. EDX analysis using a SEM Quanta 2000 Philips Fay Co., indicated the contents of Al, Si, and O to be 2.35, 50.32 and 47.35 wt %, respectively.

The alumina-grafted mesoporous silica material, 6.4 g, obtained in the previous step, was suspended in 50 ml of aqueous solution containing 0.14 mol/l of nickel nitrate (Ni(NO$_3$)$_2$*6H$_2$O), 0.42 mol/l of urea, and 0.02 mol/l of HNO$_3$, pH being 1.5. The mixture was stirred and heated at 90° C. for 24 hours. During this period, the pH increased to 6.4. The mixture was quickly cooled to 20° C. on ice bath and filtered. The solid was washed on filter with 200 ml of distilled water, and transferred into a flask with 200 ml of distilled water, stirred for 15 min at 60° C. and filtered again. This washing procedure was repeated twice.

The washed material was dried in air at 90° C. for 24 h and calcined at 500° C. for 4 h (the heating rate 5° C./min), which yielded 19.2 gram. EDX analysis indicated the contents of Ni, Si, Al and O to be 63.47, 21.19, 1.3 and 14.04 wt %, respectively. The surface area of the composite material, as measured by BET method, was 304 m$^2$/g.

The above-obtained composite material was placed into a stainless steel reactor, having internal diameter 10 mm and length 100 mm, equipped with internal thermowell and heating oven. The temperature controller maintained is the temperature within ±1 degree C. The adsorbent reduced at 450° C. in the stream of hydrogen at GHSV (gas hour space velocity) of 12000 h$^{-1}$, for 8 hours then passivated in He flow and cooled in He to ambient temperature. The material, referred to herein as BGU-1, yields about all the nickel in the form of Ni-oxide. After hydrogen reduction, this yields a metallic Ni-phase which characteristics are shown in FIG. 1 (diffraction peaks at 2θ=44.5 and 51.8°) with high dispersion that corresponds to the crystal size 4-5 nm as determined from the width of XRD peaks.

EXAMPLE 2

A sample of 6 g of silica gel (PROMEKS, PI-258) with surface area of 220 m$^2$/g and pore diameter of 26 nm was calcined for 2 hours at 500° C. for 2 h. Its water capacity at the wetness point was 2.7 cc (H$_2$O)/g. 16.2 ml of transparent solution was prepared by mixing 6 ml of distilled H$_2$O and 2.5 ml of 68% HNO$_3$, adding 9 g of Ni(NO$_3$)$_2$*6H$_2$O (0.031 mol Ni) and slowly inserting 4.1 g of (NH$_4$)$_2$HPO$_4$ (0.031 mol P). Stirring was continued for 30 min until all the salts were dissolved yielding a transparent, green solution with pH of 4.0. The solution was inserted inside the pores of silica gel by incipient wetness method. The impregnated material was dried for 4 hours in air at 120° C. (heating rate 5° C./min) and then calcined for 6 hours at 500° C. (heating rate 1° C./min). EDX analysis of the calcined composite indicated the content of Ni, P, Si, O to be 22.9, 10.9, 35.1 and 31.1 wt % respectively and the atomic ratio of Ni/P was 1.1.

0.5 g of the above composite material was reduced in a quartz reactor under atmospheric pressure with H$_2$ flux of 1000 cc*min$^{-1}$g$^{-1}$ at 580° C. for 0.5 hour (amb. to 350° C. at 3.6° C./min and 350° C. to 580° C. at 1° C./min), then passivated in He flow and cooled to ambient temperature under He. XRD analysis of the reduced material, referred to herein as BGU-2, indicates a wide amorphous hallo centered at 2θ=22° corresponding to silica and showed peaks at 2θ=40.8; 44.6; 47.3; 54.2 and 66.2° (FIG. 1) corresponding to the Ni$_2$P phosphide phase with the crystal domain size of 10 nm determined from the XRD peaks width. The total loading of this phase in BGU-2 material was 30 wt % based on EDX and XRD analysis.

EXAMPLE 3

A sample of 10 g of silica gel (PQ Co-PM5308) with surface area of 480 m$^2$/g and average pore diameter of 10 nm was calcined for 2 hours at 500° C. Its water capacity at the wetness point was 2.31 cc (H$_2$O)/g (silica). 23 ml of transparent solution was prepared by mixing 8 ml of distilled H$_2$O and 3.25 ml of 68% HNO$_3$, adding 16.25 g of Ni(NO$_3$)$_2$*6H$_2$O (0.056 mol Ni) and slowly inserting 3.75 g of (NH$_4$)$_2$HPO$_4$ (0.028 mol P). Stirring was continued for 30 min until all the salts were dissolved yielding a transparent, green solution with pH of 3.5. The impregnated material was dried for 4 h in air at 120° C. (heating rate 5° C./min) and then calcined for 6 h at 500° C. (heating rate 1° C./min). EDX analysis of the calcined composite indicated the content of Ni, P, Si, O to be 26.2, 6.4, 38.9 and 28.5 wt % respectively and the atomic ratio of Ni/P was 1.97.

0.5 g of the above composite material was reduced in a quartz reactor under atmospheric pressure with an H$_2$ flux of 1000 cc*min$^{-1}$g$^{-1}$ at 580° C. for 0.5 hour (amb. to 350° C. at 3.6° C./min and 350° C. to 580° C. at 1° C./min), then passivated in He flow and cooled to ambient temperature under He. XRD analysis of the reduced material referred as BGU-3 besides a wide amorphous hallo centered at 2θ=22° and corresponded to silica, showed peaks at 2θ=32.7; 38.4; 41.7; 44.4; 47.0 and 49.0° (FIG. 1) corresponding to the Ni$_{12}$P$_5$ phosphide phase with the crystal domain size of 9 nm determined from the XRD peaks width. The total loading of this phase in BGU-2 material was 31 wt % based on EDX and XRD analysis.

EXAMPLE 4

A sample of 6 g of silica gel (PROMEKS, PI-258) with surface area of 220 m$^2$/g and pore diameter of 26 nm was calcined for 2 h at 500° C. for 2 h. The calcined silica wetness point was 2.7 cc ($H_2O$)/g (silica) and the impregnation method was incipient wetness. 27 ml of transparent solution was prepared by mixing 13 ml of distilled $H_2O$ and 3.25 ml of 68% $HNO_3$, adding 16.25 g of $Ni(NO_3)_2 \cdot 6H_2O$ (0.056 mol Ni) and slowly inserting 2.96 g of $(NH_4)_2HPO_4$ (0.022 mol P), stirring was continued for 30 min until all the salts was dissolved, yielding a transparent, green solution. The impregnated material was dried for 4 h in drying oven at 120° C. (heating rate 5° C./min) and then calcined for 6 h at 500° C. (heating rate 1° C./min). EDX analysis of the calcined composite indicated the content of Ni, P, Si, O to be 24.9, 5.3, 40.3 and 29.5 wt % respectively and the atomic ratio of Ni/P was 2.48.

0.5 g of the above composite material was reduced in a quartz reactor under atmospheric pressure with $H_2$ flux of 1000 cc*$min^{-1}g^{-1}$ at 580° C. for 0.5 hour (amb. to 350° C. at 3.6° C./min and 350° C. to 580° C. at 1° C./min), then passivated in He flow and cooled to ambient temperature under He. XRD analysis of the reduced material referred as BGU-4 besides a wide amorphous hallo centered at $2\theta=22°$ and corresponded to silica, showed peaks at $2\theta=32.7$; 38.4; 41.7; 44.4; 47.0 and 49.0° corresponding to the $Ni_{12}P_5$ phosphide phase and peaks at $2\theta=36.4$; 41.8; 43.6; 46.6° corresponding to $Ni_3P$ phase (FIG. 1) at a wt. ratio of 0.6/0.4 and crystal size of 10 nm and 15 nm, respectively. The total loading of these phases in BGU-4 material was 30 wt % based on EDX and XRD analysis.

EXAMPLE 5

A sample of 10 g of silica gel (DAVICAT, ID-2411) with surface area of 400 $m^2$/g and average pore diameter of 8 nm was calcined at 550° C. for 2 hours. It was placed in the 250 ml flask inserted in a heating bath, provided by magnetic stirrer and condenser, that contained an aqueous solution prepared by dissolution of 93 g $Ni(NO_3)_2 6H_2O$, 84 g urea, 7 mL $HNO_3$ (70%) and 11.9 g $(NH_4)_2HPO_4$ in 150 mL of $H_2O$. The mixture was heated to 80° C. and stirred at this temperature for 24 hours. During this period, the pH increased from 0.96 to 5. The mixture was cooled to room temperature and filtered. The solid was transferred into a flask with 200 mL of distilled water at 60° C., stirred for 1.5 min and filtered again. This washing procedure was repeated twice. The washed material was dried at 120° C. for 4 hours (the heating rate 5° C./min) and calcined in air at 500° C. for 6 hours (the heating rate 1° C./min). EDX analysis, performed by the instrument SEM Quanta 2000 Philips Fay Co., indicated the contents of Ni, P, Si, and O to be 62.8, 13.1, 6.4 and 17.6 wt. %, respectively. The surface area of the composite material, as measured by BET method, was 175 $m^2$/g.

0.5 g of the above composite material was reduced in a quartz reactor under atmospheric pressure with $H_2$ flux of 1000 cc*$min^{-1}g^{-1}$ at 580° C. for 0.5 hour (amb. to 350° C. at 3.6° C./min and 350° C. to 580° C. at 1° C./min), then passivated in He flow and cooled to ambient temperature under He. XRD analysis of the reduced material referred as BGU-5 besides a wide amorphous hallo of low intensity centered at $2\theta=22°$ and corresponded to silica, showed peaks at $2\theta=32.7$; 38.4; 41.7; 44.4; 47.0 and 49.0° corresponding to the $Ni_{12}P_5$ phosphide phase with the crystal domain size of 30 nm determined from the XRD peaks width and peaks at $2\theta=36.4$; 41.8; 43.6; 46.6° corresponding to $Ni_3P$ phase with the crystal domain size of 3 nm determined from the XRD peaks width. The total loading of these phases in BGU-5 material was 62.2 wt. % based on EDX and XRD analysis. The surface area of the reduced BGU-5 material was 205 $m^2$/g.

EXAMPLE 6

A sample of 0.8 g of the BGU sorbent material prepared according to examples 1-5 after calcination in air was placed into a tubular stainless steel reactor, having internal diameter of 5 mm and length of 10 cm, equipped with internal thermowell and heating oven. The temperature controller was used to maintain temperature within ±1° C. The adsorbent was reduced under atmospheric pressure with $H_2$ flux of 1000 cc*$min^{-1}g^{-1}$ at 580° C. for 0.5 h (amb. to 350° C. at 3.6° C./min and 350° C. to 580° C. at 1° C./min), and cooled under $H_2$ flow to the reaction temperature of 300° C. The hydrotreated diesel fuel with IBP=193° C. and FBP=351° C., density 0.83388 g/$cm^3$ containing 30.6 vol. % aromatic hydrocarbons, 1.9 vol. % olefins, 67.5 vol. % paraffins and 15 ppm wt. sulfur was used as a feed for testing the sorbents. The run was started first by purging the system with He, then using He to increase pressure up to 17 bar. The liquid was pumped at LHSV (liquid hour space velocity) of 3.5 $h^{-1}$ through the reactor kept at 300° C. and after passing the reactor was collected in the cooled trap. The sulfur content in diesel fuel at the reactor outlet ($S_{out}$, ppm wt.) was analyzed periodically by G.C method using HP 6890 A instrument equipped with detector GC-355 SCD for sulfur analysis.

Figure 2:
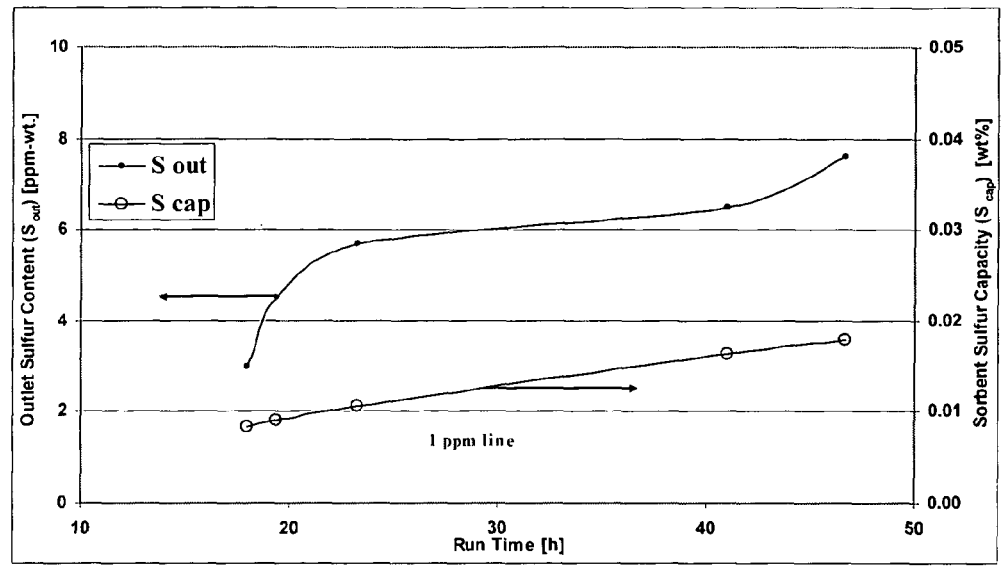
FIG. 2 shows a reference sorbent activity.

The testing results of the BGU-1 reference material containing metallic nickel phase are shown in FIG. 2. The nickel phase in this sorbent is not active enough in order to remove the sulfur from diesel fuel at selected space time (contact time) to less than 1 ppm. At the beginning of run the $S_{out}$ was 3 ppm wt. and slowly rose during about 50 h to ~8 ppm wt.

Figure 3:
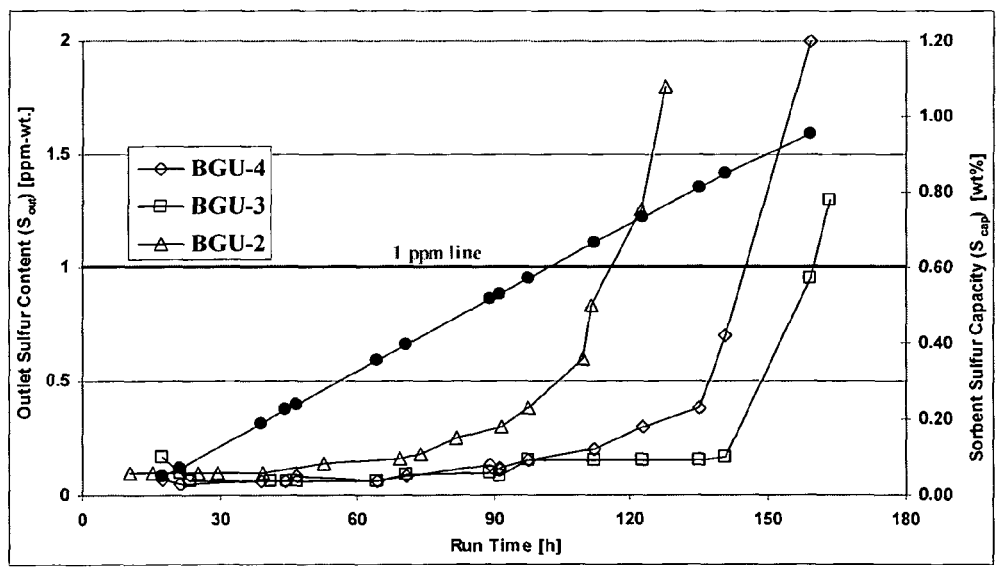
FIG. 3 shows sorbent activity for examples 2-4 of the present invention.

The testing results of BGU-2, BGU-3 and BGU-4 sorbents containing different nickel phosphide phases are presented in FIG. 3. All the materials displayed high activity meaning sulfur adsorption rate high enough to yield $S_{out}$~0.1 ppm·wt at selected contact time. The total sulfur capacity obtained for BGU-2, BGU-3 and BGU-4 sorbents in runs stopped when the $S_{out}$ value reached 1 ppm wt. was 0.65; 1.00 and 0.85 g per 100 g of sorbernt, respectively. The EDX analysis of spend sorbents gave, respectively 0.67; 1.02 and 0.88 wt. % of sulfur. The patterns of XRD diffractograms of spend sorbents were substantially identical to that of fresh samples after hydrogen reduction that are shown in FIG. 1.

Figure 4:
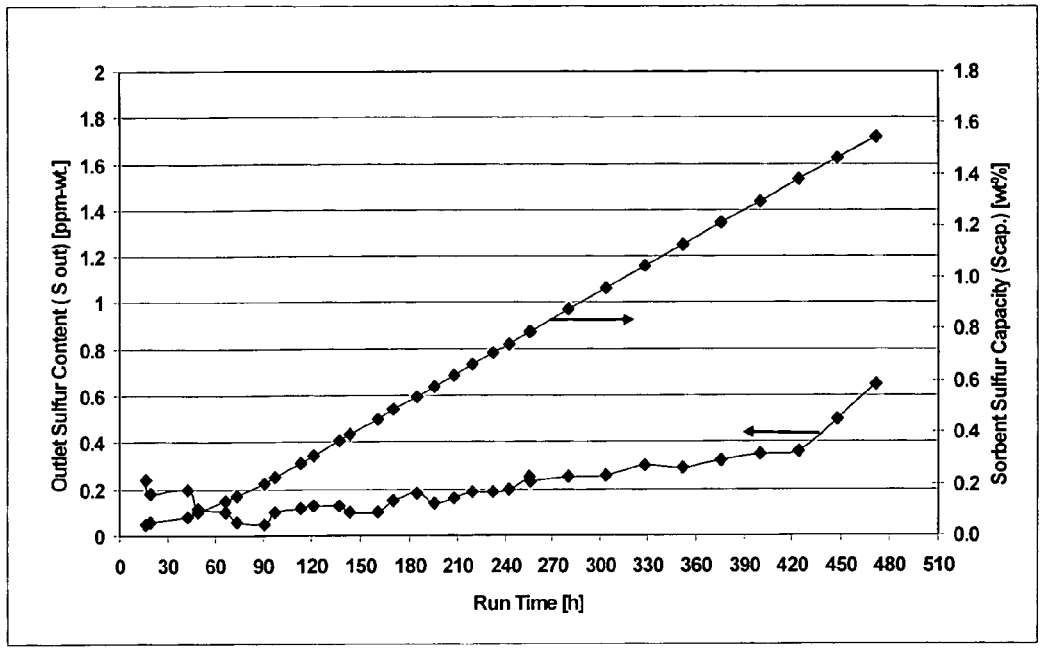
FIG. 4 shows sorbent activity for example 5 of the present invention

The testing results of BGU-5 sorbent with enhanced nickel phosphide phases loading of 62.2 wt. % are presented in FIG. 4. The material displayed high activity meaning sulfur adsorption rate high enough to yield $S_{out}$<0.5 ppm·wt at selected contact time of 2.7 $h^{-1}$. The total sulfur capacity obtained for BGU-5 sorbent in run stopped when the $S_{out}$ value exceeded 0.5 ppm wt. was ~1.5 g per 100 g of sorbernt. The EDX analysis of spend sorbent gave 1.6 wt. % of sulfur.

EXAMPLE 7

Figure 5:
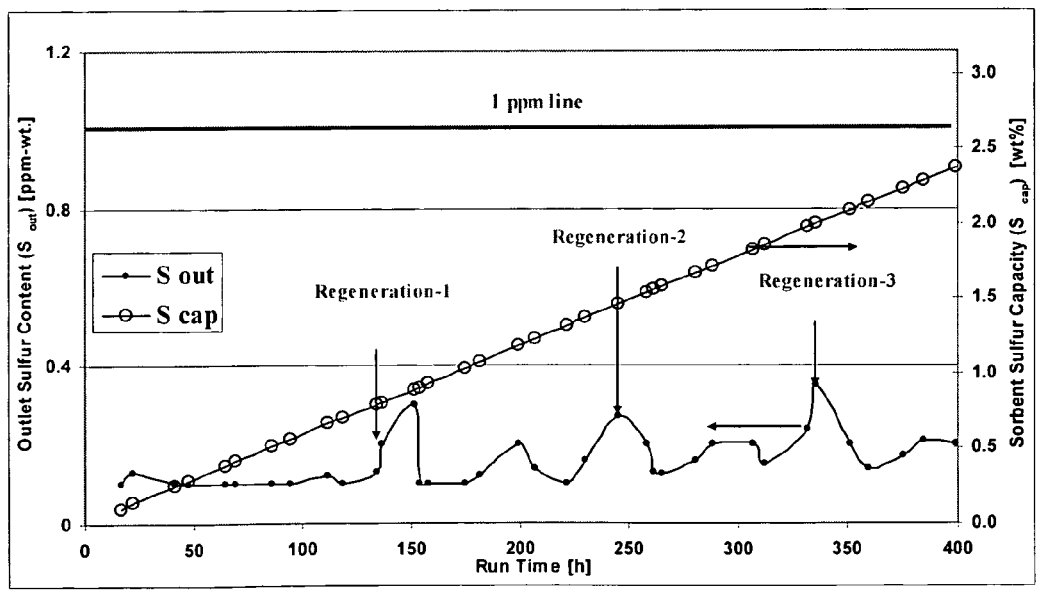
FIG. 5 shows regenerative and sorbent activity for an example of the present invention.

The sorbent BGU-3 was tested in desulfurization of diesel fuel at LHSV=3.5 $h^{-1}$ according to Example 5. The liquid pump was stopped when sulfur content in the treated diesel fuel $S_{out}$ reached 0.2 ppm wt. The pressure in reactor was reduced to atmospheric and the temperature increased to 550° C. (heating rate 1° C./min) under $H_2$ flux of 1000 cc*$min^{-1}$ $g^{-1}$, and kept at 550° C. for 3.5 hours making the reductive regeneration of the sorbent. The reactor then was cooled down to the reaction temperature 300° C. under $H_2$ flow, then purged with He and the pressure of He was increased to 17 bar. The run was restarted at LHSV of 3.3 $h^{-1}$, and sulfur content in the treated diesel fuel was in range of 0.1-0.3 ppm wt. over additional 110 hours, as shown in FIG. 5, rising the amount of sulfur removed from diesel fuel by the BGU-3 sorbent by additional 0.66 wt % (totally o.85+0.66=1.51 wt. %). The reductive regeneration procedure at the same conditions was repeated again twice as shown in FIG. 5, so that the total amount of sulfur removed from diesel fuel reached 2.35 wt. %. The spent sorbent BGU-3 after this run was analyzed by XRD which showed that the patterns of the $Ni_{12}P_5$ phase did not substantially change as shown in FIG. 1.

EXAMPLE 8

Figure 6:
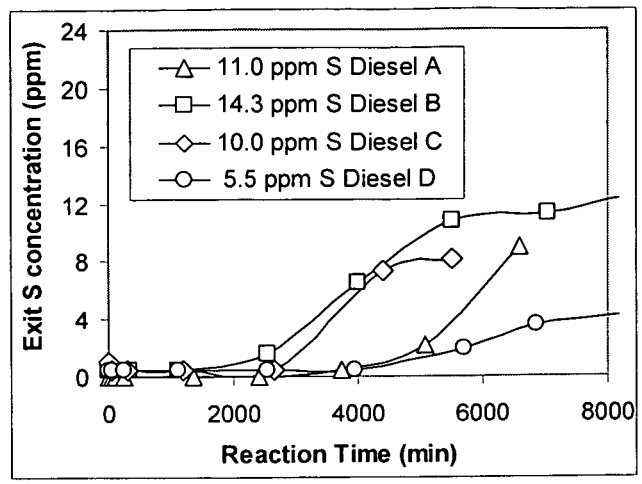
FIG. 6 shows sorbent performance on several diesel fuel samples varying in their boiling range and sulfur speciation

This example shows that the sorbent of the present invention removes a range of sulfur compounds (mercaptans, sulfides, disulfides, thiophenes, benzothiphenes (BT), dibenzothiophenes (DBT) and substituted DBTs) from hydrocarbon fuel mixtures. A variety of diesel fuel samples were subjected to desulfurization by the BGU-4 sorbent. These diesel fuel samples differed in total sulfur concentration and in the type of sulfur speciation. For example, Diesel A (boiling range: 136-387° C.) is characterized by 11 ppm total sulfur. However, refractory sulfur compounds (DBTs and higher) accounts for only 1 ppm in this sample. Diesel B was obtained by adding 4,6-dimethyl-DBT to Diesel A to raise the total sulfur concentration to 14.3 ppm. Diesel C (boiling range: 107-362° C.) is a relatively higher boiling fraction that is blended with lighter boiling fractions to make the final diesel fuel. The sulfur speciation in Diesel C is dominated by refractory sulfur compounds. Over 94% of the sulfur is more refractory than DBT, with 76% being more refractory than 4,6-dimethyl-DBT. Additionally, 50% of the sulfur compounds are heavier than 4,6-diethyl-DBT. Diesel D (boiling range: 127-336° C.) is a sample of unadditized full range diesel typically sold in the European market. The desulfurization was carried out is at a LHSV of 6/hr at 300° C. and under 250 psig pressure in a reactor containing 6 cm³ sorbent. The results are shown in FIG. 6. As seen from FIG. 6, the sorbent BGU-3 is capable of achieving sub-ppm desulfurization on a variety of diesel fuel samples, differing in their boiling range and sulfur speciation. BGU-3 extracts sulfur atoms from a variety of organo-sulfur compounds, including refractory sulfur compounds that are hard to remove by conventional hydrodesulfurization processes.

EXAMPLE 9

Figure 7:
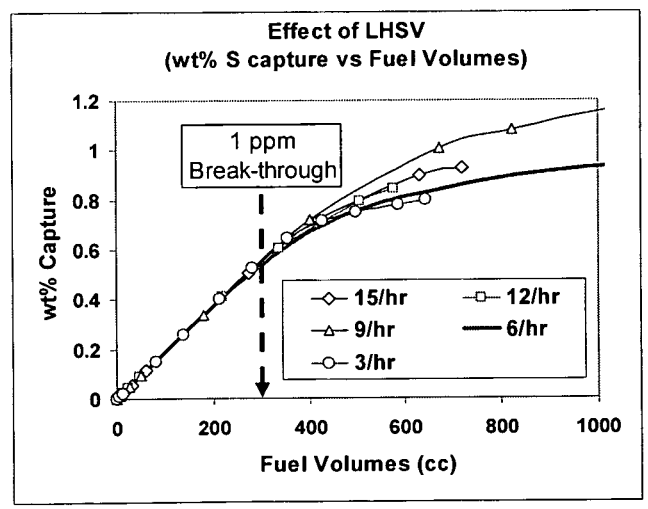
FIG. 7 shows sorbent performance as a function of LHSV.

BGU-4 sorbent maintains its reactivity (wt % sulfur capture) over a range of fuel flowrate. The influence of varying flowrate (liquid hourly space velocity or LHSV) on the sorbent reactivity was quantified in a 6 cm³ fixed bed reactor operated at 300° C. and 250 psig. These experiments were carried out with Diesel B, detailed in Example 8 above. The data presented in FIG. 7 shows that the breakthrough fuel volumes processed (measured at an exit S concentration of 1 ppm) do not change appreciably in the range of LHSV tested. Thus, BGU-4 is able to maintain its reactivity over a large turndown ratio. This facilitates application of this desulfurization process in inherently transient operation, such as on-board a vehicle. A high LHSV operation enables the usage of this sorbent in space constrained environment.

EXAMPLE 10

Figure 8:
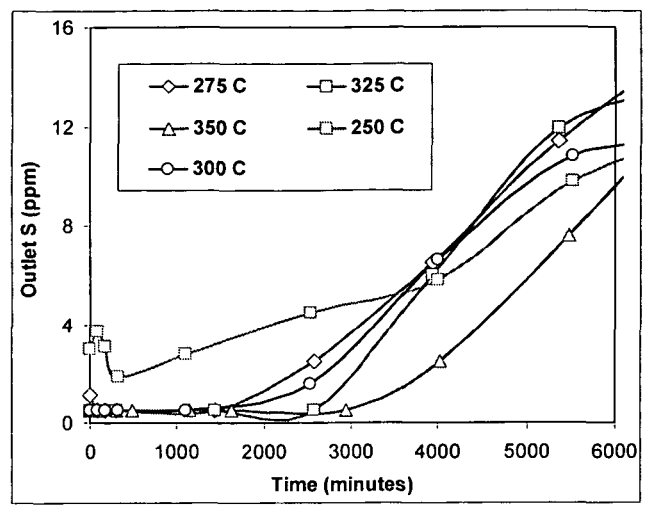
FIG. 8 shows sorbent performance as a function of reaction temperature.

BGU-4 maintains its reactivity over a wide temperature range. The influence of reaction temperature on the sorbent reactivity was quantified in a 6 cm³ fixed bed reactor operated at 6/hr LHSV and 250 psig. These experiments were carried out with Diesel B, detailed in Example 8 above. The data presented in FIG. 8 demonstrates that sub-ppm desulfurization is attained in the tested temperature range of 275-350° C. The wt % S capture by the sorbent does not indicate a sharp maximum in this temperature range either. This robustness of the sorbent to reaction temperature would be especially beneficial to transient operations, such as the sub-ppm desulfurization of diesel fuel (containing 10-50 ppm total sulfur) on-board a vehicle.

EXAMPLE 11

Figure 9:
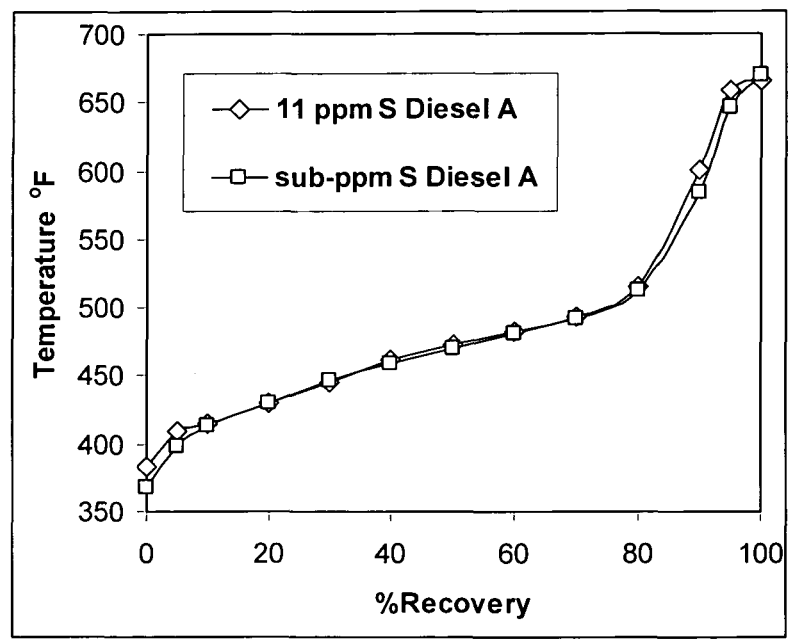
FIG. 9 shows the boiling point curves for feed and product diesel fuel.

The desulfurization process does not significantly change the properties of the resulting desulfurized fuel, thereby helping ensure that the lower sulfur fuel product meets fuel specifications. The following tests were carried out on Diesel A sample that was desulfurized at 300° C., 250 psig and 6/hr LHSV using BGU-4 adsorbent. As shown in FIG. 9, there is no appreciable change in the boiling range of Diesel A and sub-ppm sulfur product of Diesel A as a result of this desulfurization process (ASTM D86-01). There was also no significant change in the API gravity (ASTM D4052-96), Calculated Cetane Index (ASTM D4737-96a (2001)) and lubricity of the fuel measured by the average wear scar length (ASTM D6079) as indicated in FIG. 10.

What is claimed is:

1. A method for adsorptively removing sulfur front a hydrocarbon stream containing sulfur species, the method comprising contacting said stream with a composite adsorbent comprising a nickel phosphide complex having particles of $Ni_2P$, $Ni_{12}P_5$, $Ni_3P$ phase, or a mixture thereof deposited on a silica, mesoporous silica, silica-alumina, or carbon support, wherein the composite adsorbent adsorbs the sulfur species, thus forming a reduced sulfur hydrocarbon stream.

2. The method of claim 1 wherein the particles range in size from about 2 nm to about 30 nm.

3. The method of claim 1 wherein said particles comprise between about 15 wt % and about 80 wt % of the adsorbent.

4. The method of claim 1 wherein the adsorbent, after contacting the hydrocarbon stream, is regenerated by exposing the adsorbent to hydrogen at temperatures of 450-580° C. and times of 3-6 hours sufficient to reduce adsorbed sulfur species.

5. The method of claim 1 wherein sulfur is reduced from about 20 ppm or less to less than about 1 ppm.

6. The method of claim 1 wherein said sulfur removal is accomplished without added hydrogen.

7. The method of claim 1 wherein said sulfur species adsorptively removed comprise mercaptans, sulfides, disulfides, thiophenes, benzothiphenes, dibenzothiophenes, and/or substituted dibenzothiophenes.

8. The method of claim 1 wherein the sorbent maintains its capacity over a range of flowrates from 0.5/hr to 30/hr.

9. The method of claim 8 wherein the sorbent maintains its capacity over a range of flowrates from 1/hr to 20/hr.

10. The method of claim 9 wherein the sorbent maintains its capacity over a range of flowrates from 3/hr to 15/hr.

11. The method of claim 1 wherein the sorbent maintains robust reactivity over a wide temperature range from 150-400° C.

12. The method of claim 11 wherein the sorbent maintains robust reactivity over a temperature range from 200-375° C.

13. The method of claim 12 wherein the sorbent maintains robust reactivity over a temperature range from 275-350° C.

14. The method of claim 1 wherein the hydrocarbon stream is an unadditized fuel, and wherein the desulfurization process does not significantly change any bulk properties of the unadditized diesel fuel.

15. The method of claim 1 wherein the adsorbent has a sulfur adsorption capacity of at least 1 gram of sulfur per 100 grams of adsorbent.

16. The method of claim 1 wherein the nickel phosphide complex has particles of $Ni_{12}P_5$ and/or $Ni_3P$ phase deposited on the support.

17. The method of claim 16 wherein the adsorbent has a sulfur adsorption capacity of at least 1 gram of sulfur per 100 grams of adsorbent.

* * * * *